(12) United States Patent
Johnson et al.

(10) Patent No.: US 8,725,924 B2
(45) Date of Patent: May 13, 2014

(54) INFORMATION BACKUP SYSTEM WITH STORING MECHANISM AND METHOD OF OPERATION THEREOF

(75) Inventors: Simon B. Johnson, Bonney Lake, WA (US); Lev M. Bolotin, Kirkland, WA (US)

(73) Assignee: ClevX, LLC, Kirkland, WA (US)

( * ) Notice: Subject to any disclaimer, the term of this patent is extended or adjusted under 35 U.S.C. 154(b) by 208 days.

(21) Appl. No.: 13/273,214

(22) Filed: Oct. 13, 2011

(65) Prior Publication Data

US 2012/0066427 A1 Mar. 15, 2012

Related U.S. Application Data

(63) Continuation-in-part of application No. 12/303,114, filed as application No. PCT/US2007/070283 on Jun. 1, 2007, now abandoned.

(60) Provisional application No. 60/803,711, filed on Jun. 1, 2006, provisional application No. 61/429,453, filed on Jan. 3, 2011.

(51) Int. Cl.
*G06F 13/36* (2006.01)
*G06F 13/00* (2006.01)

(52) U.S. Cl.
USPC .......... 710/306; 710/2; 710/5; 710/8; 710/15; 710/36

(58) Field of Classification Search
None
See application file for complete search history.

(56) References Cited

U.S. PATENT DOCUMENTS

| | | |
|---|---|---|
| 5,666,495 A | 9/1997 | Yeh |
| 6,664,760 B2 | 12/2003 | Kobayashi |
| 6,691,196 B2 | 2/2004 | Mills et al. |
| 6,954,660 B2 | 10/2005 | Aoyama |
| 7,054,594 B2 | 5/2006 | Bloch et al. |
| 2004/0116155 A1 | 6/2004 | Aisenberg |
| 2004/0157639 A1 | 8/2004 | Morris et al. |
| 2005/0208967 A1 | 9/2005 | Buniatyan |
| 2008/0140872 A1* | 6/2008 | Wright ............................ 710/16 |

FOREIGN PATENT DOCUMENTS

| | | |
|---|---|---|
| EP | 1583199 A2 | 10/2005 |
| KR | 1019990085912 A | 12/1999 |
| KR | 1020030042877 A | 6/2003 |
| KR | 20050081959 A | 8/2005 |
| WO | 2004025933 A1 | 3/2004 |

OTHER PUBLICATIONS

International Search Report for Application No. PCT/US2007/070283 dated Oct. 29, 2007.

* cited by examiner

*Primary Examiner* — Scott Sun
(74) *Attorney, Agent, or Firm* — Ishimaru & Associates LLP (57) ABSTRACT

A method of operation of an information backup system includes: supplying a power to a first communication port and a second communication port; electrically connecting a host microcontroller to the first communication port for connecting a handheld device; electrically connecting the host microcontroller to the second communication port for connecting a mass storage device, the host microcontroller is for functioning as a host to the second communication port and the first communication port; and transferring data between the first communication port and the second communication port.

20 Claims, 6 Drawing Sheets

INFORMATION BACKUP SYSTEM WITH STORING MECHANISM AND METHOD OF OPERATION THEREOF

CROSS-REFERENCE TO RELATED APPLICATION(S)

This is a Continuation-in-part of co-pending U.S. patent application Ser. No. 12/303,114 filed Dec. 1, 2008, which is a 35 USC 371 application of International Application number PCT/US2007/070283 filed Jun. 1, 2007, which claims the benefit of U.S. Provisional Patent Application Ser. No. 60/803,711, filed Jun. 1, 2006, and the subject matter thereof is incorporated herein by reference thereto.

This application also claims the benefit of U.S. Provisional Patent Application Ser. No. 61/429,453 filed Jan. 3, 2011, and the subject matter thereof is incorporated herein by reference thereto.

TECHNICAL FIELD

The present invention relates generally to an information backup system, and more particularly to a system with storage.

BACKGROUND ART

Handheld devices, such as palm computers and cell phones, have become widely available and very popular for personal use. For example, cell phones are most commonly used while the user is outside of the home or office. Many problems can arise while a cell phone is being used in this manner. The cell phone can be easily damaged, misplaced, or lost. When this happens, any information stored in the cell phone is lost as well. Often, this information does not exist anywhere other than in the memory of the cell phone. Sometimes, the information can be laboriously re-entered from other sources. Often, the information is irretrievably lost.

Some small devices have been developed for backing up cell phone memories. One is about the size of a Universal Serial Bus (USB) Flash drive and comes equipped with a USB connector for managing contacts via a computer. Information is stored in its integral non-volatile memory.

Another device is battery powered with an interchangeable tip for connecting to various cell phone models. Again, information is stored in an integral non-volatile memory. Some systems allow editing and transferring of cell phone entries between the cell phone and Outlook® or Outlook Express® programs on a personal computer.

Given the rapid change and "mass customization" in cell phone technology, it is often difficult to replace a lost, damaged, or stolen cell phone with the exact same model. This results in the need to retrieve and/or recreate information for a brand new cell phone.

More and more professionals do not travel with traditional laptops, but rather with their smart phone only. As with any small portable device, the chances of losing the smart phone are quite high. As with personal computers, the virtues of backing up data in a portable device are well known and understood to minimize the inconvenience of losing the cell phone.

A few smart phone applications allow data backup to phone-resident local SD (Secure Digital) card storage. A problem with this is that the phone can be lost or stolen along with the SD card. Few solutions exist that allow a user to copy phone content to external storage that remains in the user's possession and cannot be lost or stolen.

Thus, a need still remains for an information backup system with storing mechanism to reliably retrieve stored information. In view of the information availability and reliability, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of an information backup system including: supplying a power to a first communication port and a second communication port; electrically connecting a host microcontroller to the first communication port for connecting a smart phone; electrically connecting the host microcontroller to the second communication port for connecting a mass storage device, the host microcontroller is for functioning as a host to the second communication port and the first communication port; and transferring data between the first communication port and the second communication port.

The present invention provides an information backup system, including: a power supply for supplying a power to a first communication port and a second communication port; and a host microcontroller, coupled to the power supply, for electrically connecting to the first communication port for connecting a smart phone, electrically connecting to the second communication port for connecting a mass storage device, transferring data between the first communication port and the second communication port, and functioning as a host to the second communication port and the first communication port.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "handheld device" referred to herein is meant to include devices such as personal digital assistants (PDAs), personal use navigation (GPS) systems, iPods, cell phones, mini tablet computers, et cetera. The term "cell phone" referred to herein is meant to include traditional cell phones as well as "smart" phones including digital screens, built-in computers, Internet connection devices, cordless phones, and other phones with add-on features such as cameras and music-video capability that are becoming more popular as integral components of the basic cell phone.

The term "hand-held slave device" referred to herein means devices that are used alone but are connectable at some point in time to host computer systems for information and/or data to be uploaded or downloaded. The term includes cell phones, smart phones (acting as slave devices), mobile phones, tablet computers, e-book readers, personal organizers, global positioning systems (GPS), and similar devices.

A number of solutions have been created but have difficulty addressing the problem of being able to take information backed up from one cell phone and transferring it to a replacement cell phone of a different make and model. Existing solutions are good at restoring information back to an identical phone but have trouble adapting the information to another model possessing a different communication interface.

There are a number of cell phone backup solutions on the market currently. Most of which require backing up data to the cloud; e.g., the Internet. That means a service or third party provider must supply storage to house this data in case it needs to be retrieved. This solution has problems including providing memory storage space costs money that is passed along to the user in the form of monthly or yearly fees, cloud-based data can be hacked exposing personal information, and the information is not available if the Internet or service provider is down. Embodiments of the present invention provide answers or solutions to the problems.

Figure 1:
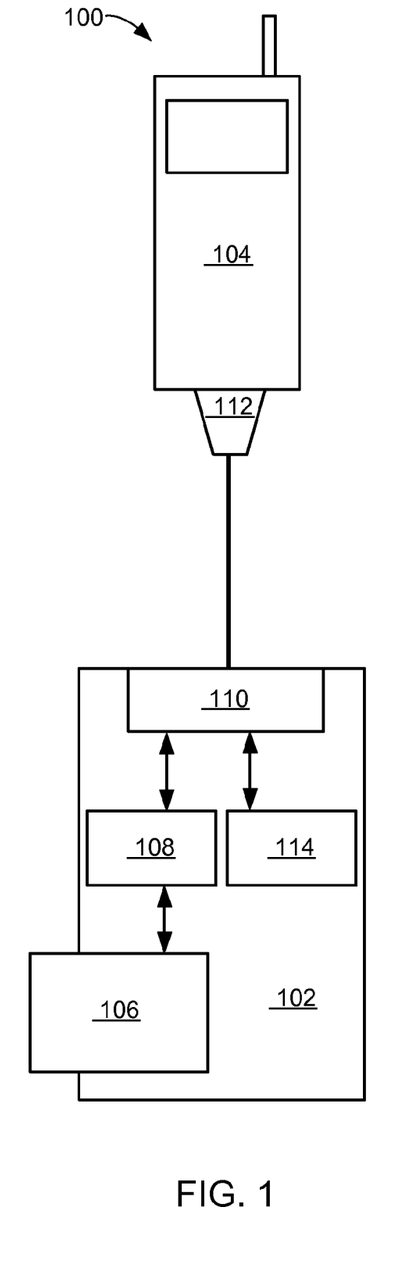
FIG. 1 is an information backup system with storing mechanism in a first embodiment of the present invention.

Referring now to FIG. 1, therein is shown an information backup system 100 with storing mechanism in a first embodiment of the present invention. The information backup system 100 represents a hardwire information backup system.

The information backup system 100 includes an information backup device 102, a handheld device 104, and a removable memory module 106. The removable memory module 106 is capable of being installed into another information backup system that is compatible with a different type of handheld device, such as a handheld device 204 of FIG. 2. For example, the handheld device 104 can represent a portable device including a smart phone.

When installed, the removable memory module 106 is connected to a microcontroller 108, which is a specialized microprocessor. The microcontroller 108 is connected to an electrical connector module 110, which is connected by a cord to a hardwire connector 112 for a particular handheld device, such as the handheld device 104.

The electrical connector module 110 can also be connected to a charger 114 for charging a rechargeable battery (not shown) in the handheld device 104. The information backup device 102 can be powered from the power supply of the handheld device 104, an internal device power supply, or from a handheld device's charger, such as the charger 114.

The removable memory module 106 can be exchanged between various embodiments of the present invention because it has a "common" format. Communication ports and protocols among handheld devices are very diverse. For example, there are almost as many cell phone interfaces as there are cell phone models. If a new phone is acquired that is not compatible with an existing backup system, the removable memory module 106 of the backup system can be installed in a new backup system having the appropriate microprocessor to facilitate information restoration to the newly acquired phone.

The microcontroller 108 receives communication information, through the electrical connector module 110, from a memory in the handheld device 104. The microcontroller 108 provides responding communication information to the handheld device 104 in response to the communication information. The handheld device 104 releases data information from the memory to the microcontroller 108 in response to the responding communication information. The microcontroller 108 writes the data information into the removable memory module 106.

Figure 2:
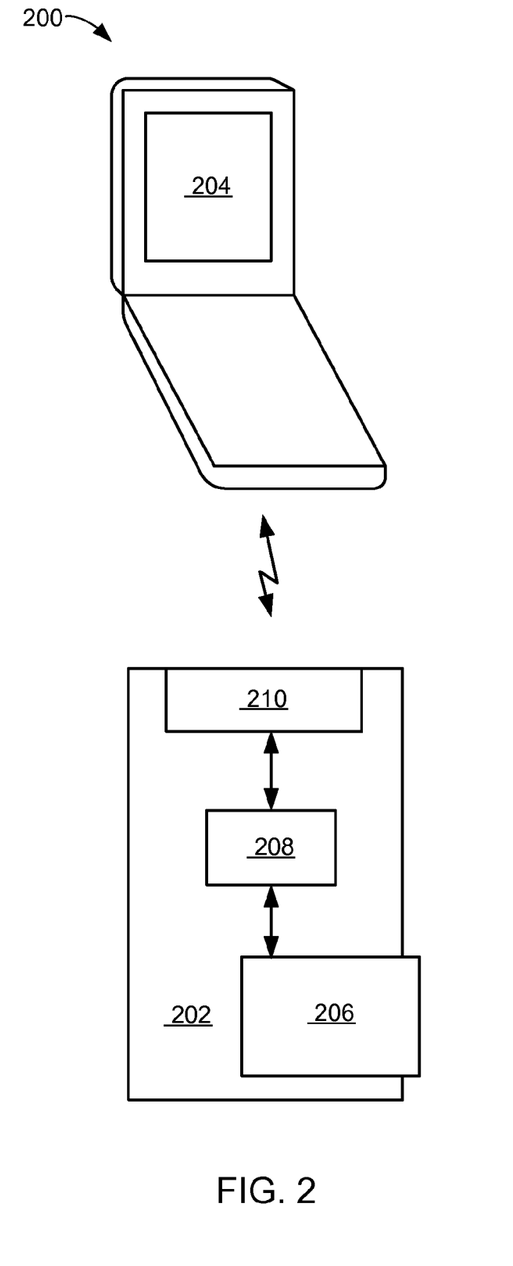
FIG. 2 is an information backup system with storing mechanism in a second embodiment of the present invention.

The microcontroller 108 also receives additional communication information from a memory in a different handheld device, such as the handheld device 204. The microcontroller 108 provides additional responding communication information to the handheld device 204 in response to the additional communication information. The microcontroller 108 rewrites the data information from the removable memory module 106 to the memory in the different handheld device.

For the handheld device 104 having the same connector configuration as the hardwire connector 112, information regarding the communication information including handshake signals, the baud rate, the voltages, and the connector pin configuration can be stored with the microcontroller 108 and/or the removable memory module 106.

The removable memory module 106 can be a Flash card, a USB Flash drive, a removable non-volatile memory, or any other type of portable memory. Information is stored in a format that can be read or written by a computer application in addition to being read or written by the information backup device 102.

Referring now to FIG. 2, therein is shown an information backup system 200 with storing mechanism in a second embodiment of the present invention. The information backup system 200 represents a wireless information backup system. The information backup system 200 includes an information backup device 202 and the handheld device 204.

For example, the handheld device 204 can represent a wireless handheld device, a Bluetooth cell phone, or a wireless backup device. Also for example, the information backup device 202 can represent a different information backup device different from the information backup device 102 of FIG. 1.

The information backup device 202 includes a removable non-volatile memory module 206, which is connectable to a microcontroller 208. The microcontroller 208 is connected to a radio frequency (RF) transceiver 210, which communicates via Bluetooth or infrared with the handheld device 204.

Figure 3:
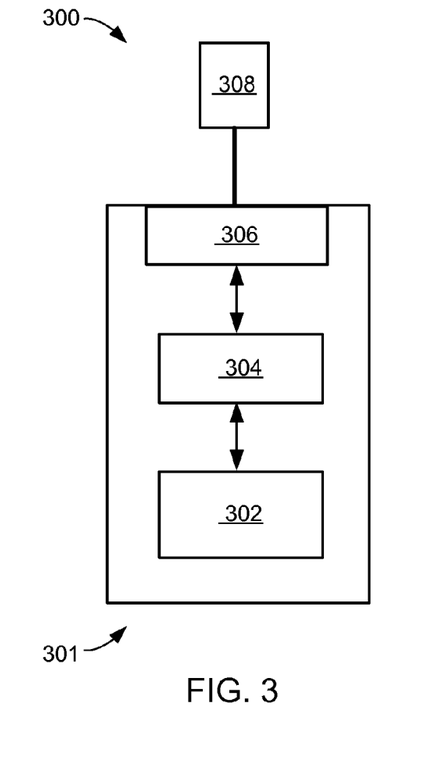
FIG. 3 is an information backup system with storing mechanism in a third embodiment of the present invention.

Referring now to FIG. 3, therein is shown an information backup system 300 with storing mechanism in a third embodiment of the present invention. The information backup system 300 includes an information backup device 301 having a removable memory module 302, a microcontroller 304, and an electrical connector module 306 with a wire connection 308. For example, the information backup device 301 can represent a hardwire backup device.

The wire connection 308 is removable and can be replaced with a connection of a different configuration to be adaptable to different handheld devices. This can use replaceable connector tips as well.

The microcontroller 304 is responsible for communication information including handshaking with the handheld device to read/write information. The microcontroller 304 interfaces with the electrical connector module 306 and supplies a communication channel, which operates for a number of different makes and models of handheld devices.

Figure 4:
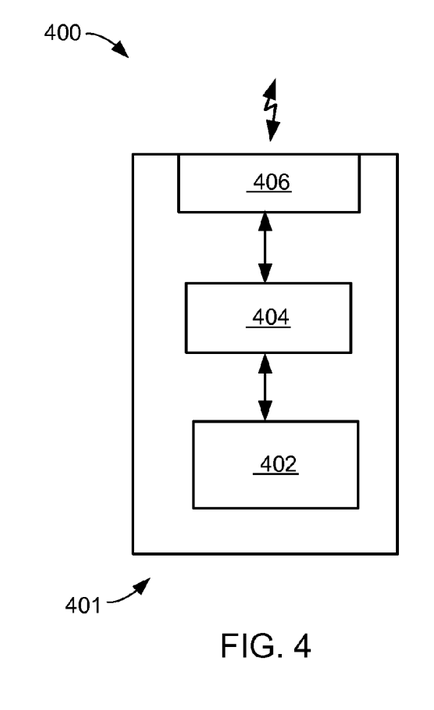
FIG. 4 is an information backup system with storing mechanism in a fourth embodiment of the present invention.

Referring now to FIG. 4, therein is shown an information backup system 400 with storing mechanism in a fourth embodiment of the present invention. The information backup system 400 includes an information backup device 401 having a removable non-volatile memory module 402 connected to a microcontroller 404. For example, the information backup device 401 can represent a wireless backup device.

The microcontroller 404 is connected with a transceiver 406 that provides a radio frequency (RF) or infrared frequency communication channel. In particular, if the handheld device is a cell phone, which supports the Bluetooth communication standard, the same backup device, such as the information backup system 400, is capable of supporting most cell phones using this standard.

Figure 5:
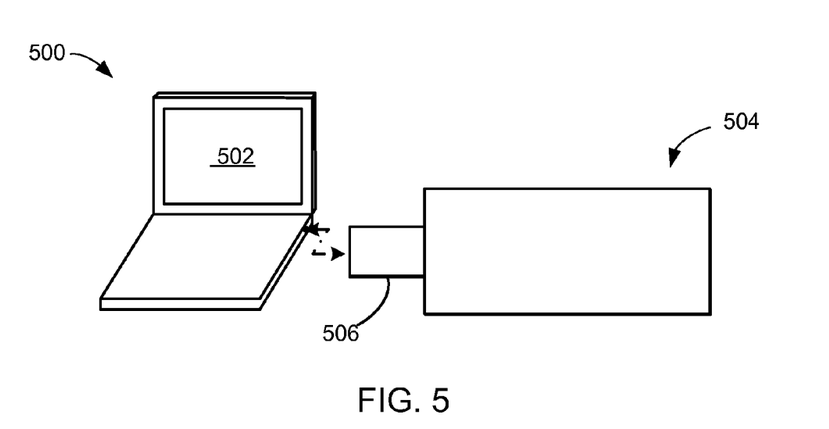
FIG. 5 is an information backup system with storing mechanism in a fifth embodiment of the present invention.

Referring now to FIG. 5, therein is shown an information backup system 500 with storing mechanism in a fifth embodiment of the present invention. The information backup system 500 includes a computer 502. For example, the computer 502 can represent a portable computer or a personal computer.

The information backup system 500 includes a removable memory module 504 similar to the removable non-volatile memory module 206 of FIG. 2, the removable memory module 302 of FIG. 3, and the removable non-volatile memory module 402 of FIG. 4. The removable memory module 504 has a Universal Serial Bus (USB) connector 506, which can be connected to the computer 502. This permits the removable memory module 504 to be accessed directly by a host computer equipped with a memory module reader. This facilitates transfers between not only information backup systems but computers as well. This permits editing of information that can then be transferred back to the information backup system and to the handheld device.

Furthermore, the information can be formatted within a NAND Flash device or backup module so it is compatible with existing computer applications. For example, for a cell phone contact applications such as Outlook® and Thunderbird® can be used. The information backup system 500 appears as a standard USB Flash drive to the computer 502. Thus, cell phone information becomes immediately available to all computer resident applications.

Figure 6:
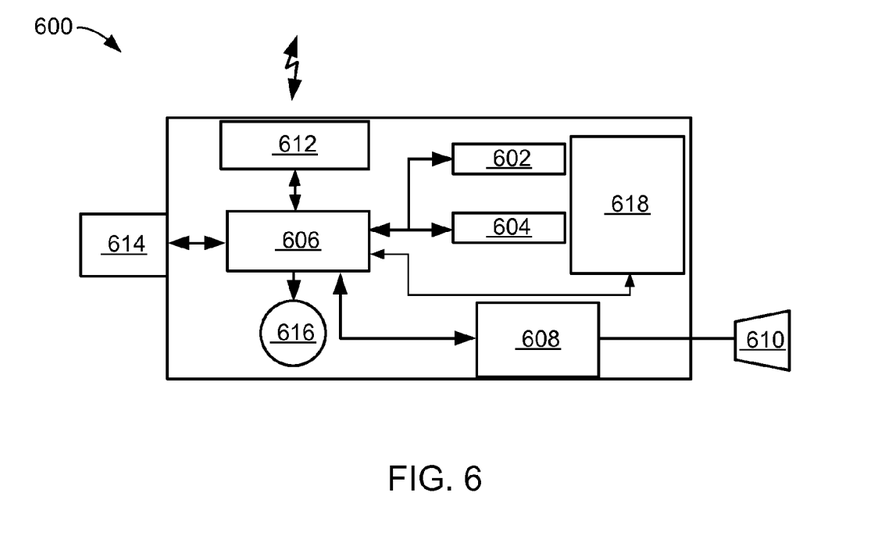
FIG. 6 is an information backup system with storing mechanism in a sixth embodiment of the present invention.

Referring now to FIG. 6, therein is shown an information backup system 600 with storing mechanism in a sixth embodiment of the present invention. The information backup system 600 represents a universal backup device. The information backup system 600 contains a removable memory module 602 and a non-removable memory module 604. The removable memory module 602 and the non-removable memory module 604 are connected to a microcontroller 606.

The microcontroller 606 is connected to an electrical connector module 608 for a hardwire connector 610. The microcontroller 606 is connected to a wireless connector module 612 and a USB connector 614. The microcontroller 606 is further connected to an indicator or a light-emitting diode (LED) 616 to indicate when an information backup is taking place.

The information backup system 600 is capable of automatic detection of different handheld devices to initiate appropriate information backup. This occurs by detecting either connection to the hardwire connector 610 or the USB connector 614 or by proximity to the wireless connector module 612.

The information backup system 600 is capable of transferring information between a computer internal/external storage through the information backup system 600 to a handheld device or a computer to an erasable memory, which permits making of incremental backups to be able to save the most recent information. The non-removable memory module 604 contains information files 618, which permit storage of configuration and interfacing data of most makes and models of handheld devices. It is understood that the information backup system 600 can also be incorporated in such devices as a memory stick, Flash memory card, or Subscriber Identification Module (SIM) card.

While it is possible to have a unique set of communication commands for each make and model of cell phone, most mobile communications (GSM) phones use an extended version of the standard "Attention" (AT) command set. For example, the command "AT+CPBR" is used to retrieve a cell phone book entry, whether the connection is made by hardwire or wireless. Once the channel has been opened, the same command format applies. Thus, a universal backup system with a Bluetooth interface supplies the broadest compatibility on different makes and models of cell phones.

Many smart phones including Android phones are able to connect via a Universal Serial Bus (USB) allowing them to expose Secure Digital (SD) cards and other memories to a host computer as mass storage devices. In other words, when a phone is connected to a host via a Universal Serial Bus (USB) cable, the phone appears as a mass storage device. Data can be extracted from known directories to backup information. For example, photographs can be located at a directory F:\DCIM\Camera\. Within that directory, there are Joint Photographic Experts Group (JPEG) files that can be copied directly from the phone.

Figure 7:
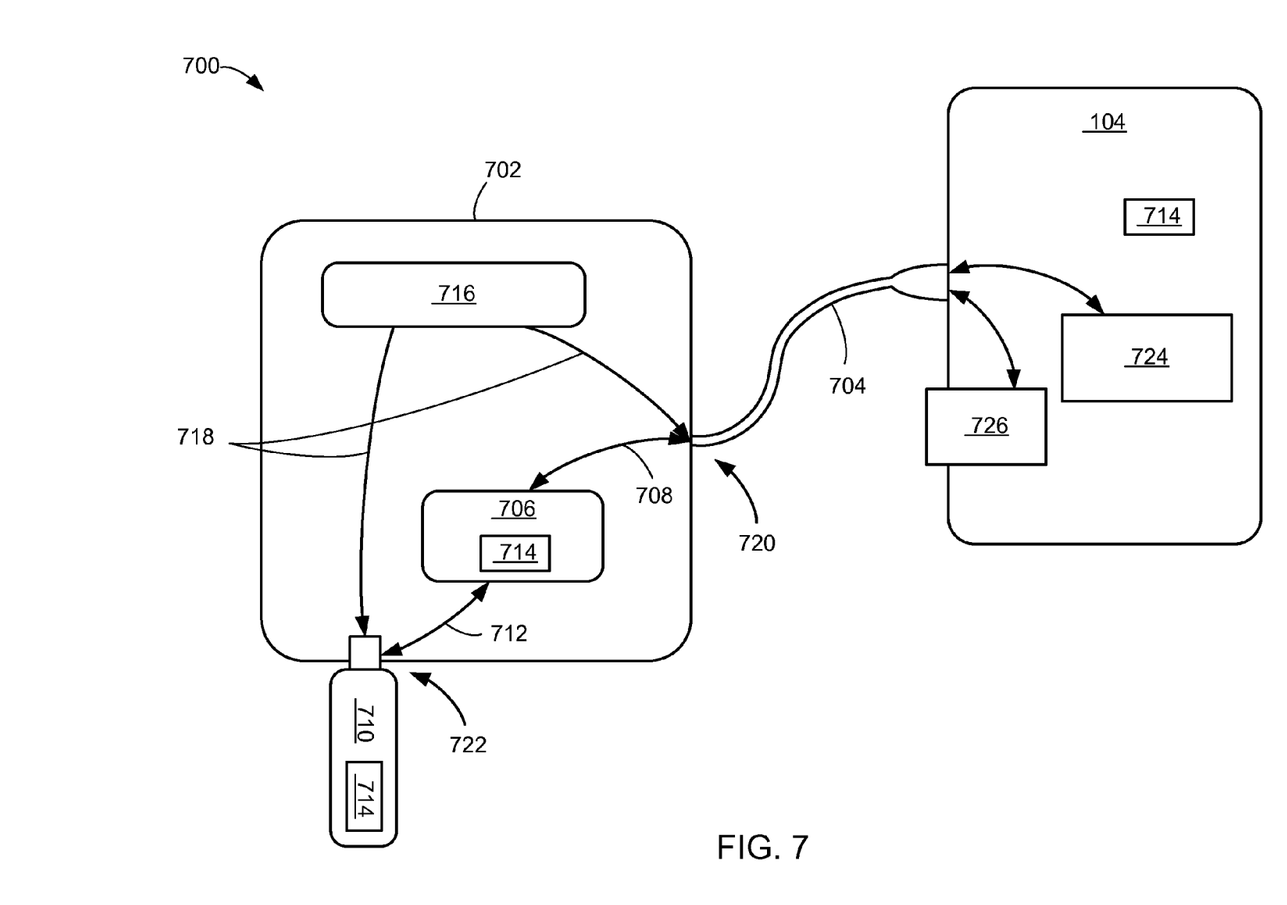
FIG. 7 is an information backup system with storing mechanism in a seventh embodiment of the present invention.

Referring now to FIG. 7, therein is shown an information backup system 700 with storing mechanism in a seventh embodiment of the present invention. The information backup system 700 can represent a combined charging pod and backup system.

The handheld device 104 is connected to an information backup device 702 via a data cable 704. The data cable 704 is defined as an electrical connector used for connection, communication, and power supply between computers and electronic devices. For example, the data cable 704 can represent a Universal Serial Bus (USB) cable equipped with a micro-USB phone connector.

The information backup device 702 includes a host microcontroller 706, which is defined as a specialized microprocessor. The host microcontroller 706 is able to connect a number of mass storage devices concurrently. For example, the host microcontroller 706 can represent a Universal Serial Bus (USB) host controller. Also for example, the host microcontroller 706 can connect two mass storage devices concurrently.

For illustration purposes, the host microcontroller 706 is shown connected to the handheld device 104 through a first communication channel 708 and a mass storage device 710 through a second communication channel 712. For example, the first communication channel 708 and the second communication channel 712 can represent connectivity including cables, connectors, and protocols used for communication and power supply between computers and electronic devices. For a specific example, the first communication channel 708 and the second communication channel 712 can represent Universal Serial Bus (USB) connections.

Connecting the mass storage device 710 directly to the handheld device 104 does not facilitate backup, as the handheld device 104 needs to act or function as a host. This embodiment relies on or includes the handheld device 104 acting or functioning as a mass storage.

Once both the mass storage device 710 and the handheld device 104 are connected to the first communication port 720 and the second communication port 722, the host microcontroller 706 can connect as a host to both slave devices, such as the mass storage device 710 and the handheld device 104. The host microcontroller 706 can transfer data 714 from the handheld device 104 to the mass storage device 710. The data 714 can be in a computer accessible file format for the computer 502 of FIG. 5.

If the data 714 is critical and is located at known directory paths on the handheld device 104, the data 714 can be copied directly to the mass storage device 710. As an example, a directory structure can appear on the handheld device 104, such as a portable device including an Android phone, as follows:

F:\DCIM\Camera (photos)
F:\Contacts\MyAndroid\My Phone (contact information)
F:\SMS\MyAndroid\My Phone (text messages)

Knowing information associated with the directory structure, the host microcontroller 706 can perform a backup process including copying directory contents by extracting the data 714 from the handheld device 104 to the mass storage device 710. If data restoration is required, the backup process is performed in a reverse order and the handheld device 104 (or another Android phones) can be written with the data 714 that was previously saved on the mass storage device 710. For example, the information backup device 702 can support a file system for storing and retrieving files including File Allocation Table (FAT) and New Technology File System (NTFS), which can be part of a mass storage class for Universal Serial Bus (USB).

The information backup device 702 includes a power supply 716, which is defined as an electrical device that provides a power 718 to electronic devices. The power supply 716 is capable of charging the handheld device 104 attached to the information backup device 702 and powering the mass storage device 710. For example, the power supply 716 can represent an internal power supply.

The information backup device 702 includes a first communication port 720 and a second communication port 722, which are defined as interfaces or connectors at the periphery of the information backup device 702 for input or output purposes. The power 718 is supplied to the first communication port 720 and the second communication port 722. The host microcontroller 706 is electrically connected to the first communication port 720 and the second communication port 722 to connect the handheld device 104 and the mass storage device 710, respectively.

The host microcontroller 706 functions as a host to the second communication port 722 and the first communication port 720 to transfer the data 714 between or through the first communication port 720 and the second communication port 722. The host microcontroller 706 reads the data 714 from the first communication port 720, writes the data 714 to the second communication port 722, reads the data 714 from the second communication port 722, and writes the data 714 to the first communication port 720.

The first communication port 720 provides electrical connection between the first communication channel 708 and the handheld device 104 through the data cable 704. The second communication port 722 provides electrical connection between the second communication channel 712 and the mass storage device 710. The first communication port 720 and the second communication port 722 can be used to transfer the data 714 with hardwire, wireless, a universal serial bus connector, or a combination thereof.

The handheld device 104 includes an internal memory 724 and a memory card 726. For example, the memory card 726 can represent a storage device including a Secure Digital card.

It has been discovered that the power supply 716 having the power 718 provides increased power source to the handheld device 104 and the mass storage device 710 thereby eliminating a need to use the handheld device 104 to supply power to the mass storage device 710 since phones typically do not have enough power to supply to a slave drive (as of this writing).

It has also been discovered that the information backup device 702 having the power 718 supplied to the first communication port 720 and the second communication port 722 improves ease of use in the form of a portable backup pod or a cell phone charger with the information backup device 702 having the power supply 716 for conveniently supplying the power 718 to the handheld device 104 and the mass storage device 710.

Figure 8:
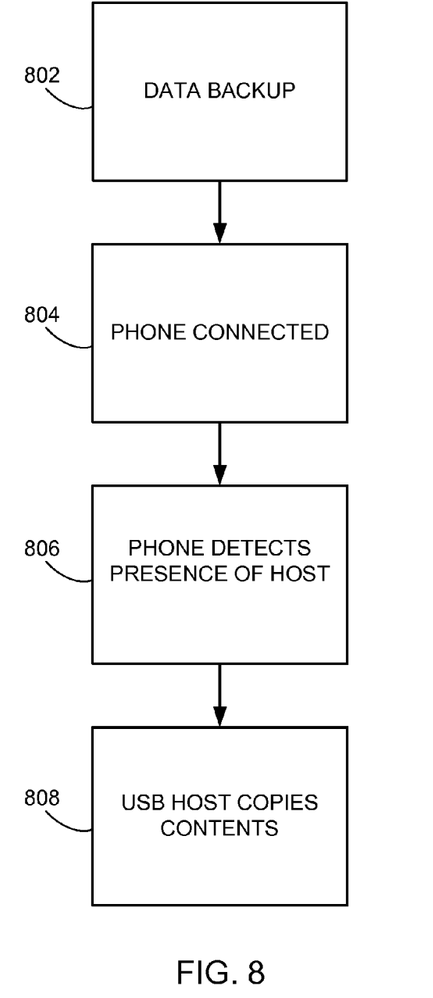
FIG. 8 is an example of a flow chart for creating a backup in the information backup system of FIG. 7.

Referring now to FIG. 8, therein is shown an example of a flow chart for creating a backup in the information backup system 700 of FIG. 7. For illustration purposes, the example is shown for the information backup system 700, although it is understood that the example is applicable to any embodiment of the present invention.

In a block 802, a data backup is created in the memory card 726 of FIG. 7. There can be a number of phone backup applications capable of creating backups that either are sent to a remote location and stored in a web-based storage or create a series of files that are saved to the memory card 726. Embodiments of the present invention have all of the data 714 of FIG. 7 reside on the mass storage device 710 of FIG. 7 identified by the handheld device 104 of FIG. 1 when connected as a slave unit. This can be a drive assigned to the memory card 726, a drive assigned to the internal memory 724 of FIG. 7, or a combination thereof.

In a block 804, the handheld device 104 is connected to the information backup device 702 of FIG. 7 by the user. The information backup device 702 has an ability to charge the attached phone, such as the handheld device 104. The reason for the connection can include a low phone battery of the handheld device 104 or simply a desire to perform a backup for the handheld device 104.

In a block 806, the handheld device 104 detects the presence of the host microcontroller 706 of FIG. 7 and exposes or identifies the memory card 726 as a mass storage device. When connected to a computer, the memory card 726 is assigned a drive letter by the computer and can be referenced in the same manner as any other mass storage device.

In a block 808, the host microcontroller 706 copies the contents of the memory card 726 to the mass storage device 710. Since the memory card 726 can be referenced by a drive letter as in the block 806, its contents can be copied to another external mass storage device.

Figure 9:
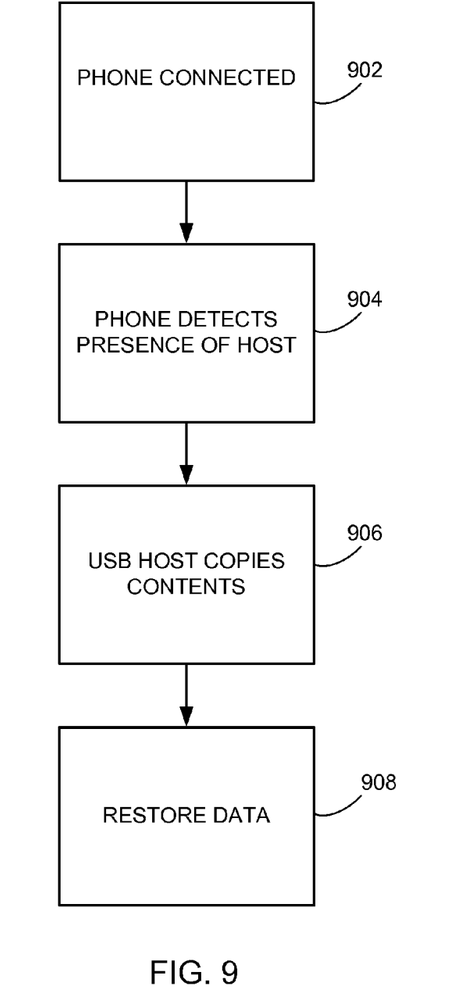
FIG. 9 is an example of a flow chart for restoring the backup previously created in FIG. 8.

Referring now to FIG. 9, therein is shown an example of a flow chart for restoring the backup previously created in FIG. 8. This procedure is the inverse of that described in FIG. 8.

In a block 902, the handheld device 104 of FIG. 1 is connected to the information backup device 702 of FIG. 7. The information backup device 702 has an ability to charge the attached phone, such as the handheld device 104. The reason for the connection can include a low phone battery of the handheld device 104 or simply a desire to perform a backup for the handheld device 104.

In a block 904, the handheld device 104 detects the presence of the host microcontroller 706 of FIG. 7 and exposes or identifies the memory card 726 of FIG. 7 as a mass storage device. When connected to a computer, the memory card 726 is assigned a drive letter by the computer and can be referenced in the same manner as any other mass storage device.

In a block 906, the host microcontroller 706 copies contents of the mass storage device 710 of FIG. 7 to the memory card 726. Since the memory card 726 can be referenced by a drive letter as in the block 806 of FIG. 8, contents of the mass storage device 710 can be copied to the memory card 726.

In a block 908, the host microcontroller 706 can be executed with a backup application to restore the data 714 of FIG. 7 to the handheld device 104. An application used to create backup files on the memory card 726 is used to restore the data 714 from these files to resident applications of the handheld device 104. Backup and restoration is analogous to procedures used to backup and restore computer files.

Figure 10:
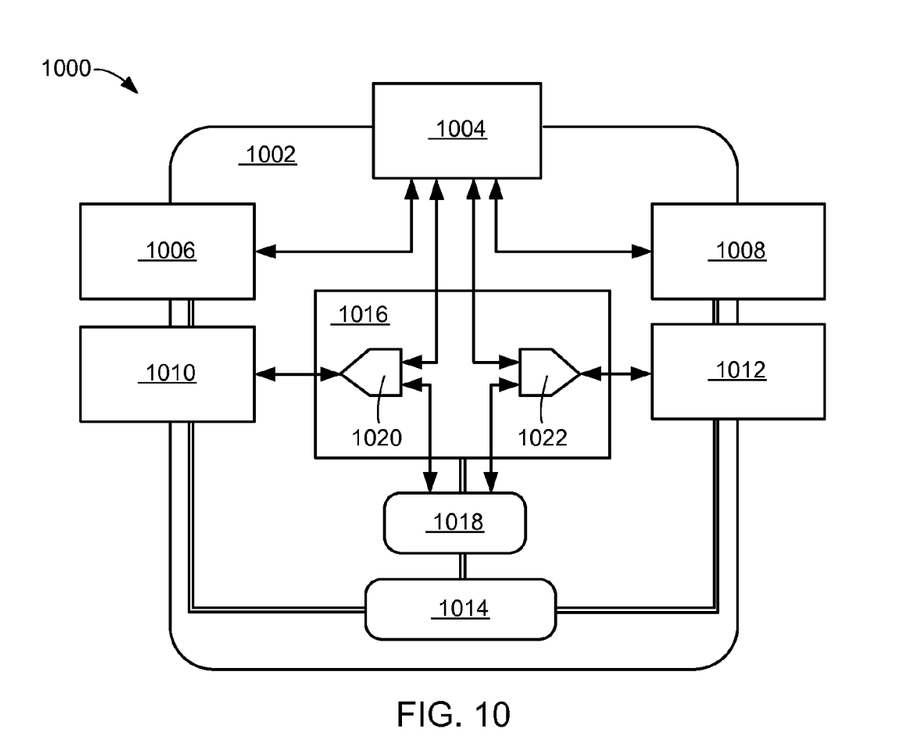
FIG. 10 is an information backup system with storing mechanism in a ninth embodiment of the present invention.

Referring now to FIG. 10, therein is shown an information backup system 1000 with storing mechanism in a ninth embodiment of the present invention. FIG. 10 shows a block diagram of the information backup system 1000. The information backup system 1000 represents a hub-based backup system.

The information backup system 1000 includes a hub 1002, which is a hardware device that is used to network multiple computers and peripherals together. The hub 1002 is a multi-port device with each port used for wire connecting in one device. The hub 1002 also can use wireless communication channels for connecting multiple wireless devices. For example, the hub 1002 can represent a multi-port Universal Serial Bus (USB) hub.

The hub 1002 includes a number of communication ports. For example, the hub 1002 has four communication ports. The communication ports include an upstream port 1004, a first downstream port 1006 (A), a second downstream port 1008 (B), a third downstream port 1010 (C), and a fourth downstream port 1012 (D). A power supply 1014 is used to power all peripherals that might be connected to the downstream ports.

The upstream port 1004 connects the hub 1002 directly or through other hubs to a host system. The first downstream port 1006, the second downstream port 1008, the third downstream port 1010, and the fourth downstream port 1012 connect the hub 1002 directly or through other hubs to devices for communicating with the host system.

In the hub 1002, a channel switch 1016 is used to switch a downstream port, such as the third downstream port 1010, and another downstream port, such as the fourth downstream port 1012, between the upstream port 1004 and a host microcontroller 1018.

The host microcontroller 1018 is defined as a specialized microprocessor for controlling operation of the hub 1002. For example, the host microcontroller 1018 represents a USB host controller or a USB host microcontroller.

The channel switch 1016 is of a single pole-double throw type. The power supply 1014 provides a power, such as the power 718 of FIG. 7, and thus is electrically connected to the first downstream port 1006, the second downstream port 1008, the third downstream port 1010, and the fourth downstream port 1012, the channel switch 1016, and the host microcontroller 1018.

In a first position, the third downstream port 1010 and the fourth downstream port 1012 are connected to the host microcontroller 1018 by a first switch 1020 and a second switch 1022, respectively. In this mode, the hub 1002 functions as an information backup device consistent with other embodiments of the present invention. In the second position, the channel switch 1016 connects the third downstream port 1010 and the fourth downstream port 1012 with the upstream port 1004. In this mode, the hub 1102 behaves as a four-port hub.

For example, the third downstream port 1010 and the fourth downstream port 1012 can represent the first communication port 720 of FIG. 7 and the second communication port 722 of FIG. 7. Also for example, the data 714 of FIG. 7 can be read from the third downstream port 1010 and written to the fourth downstream port 1012 by the host microcontroller 1018.

The information backup system 1000 is shown having the hub 1002. The information backup system 1000 includes a power supply, such as the power supply 1014. The information backup system 1000 includes a communication host, such as the host microcontroller 1018. The information backup system 1000 includes a communication channel switch, such as the channel switch 1016, capable of routing two of the downstream ports to the communication host so files can be transferred between the downstream ports.

Thus, it has been discovered that the information backup system of the present invention furnish or furnishes important and heretofore unknown and unavailable solutions, capabilities, and functional aspects for storing mechanism.

Figure 11:
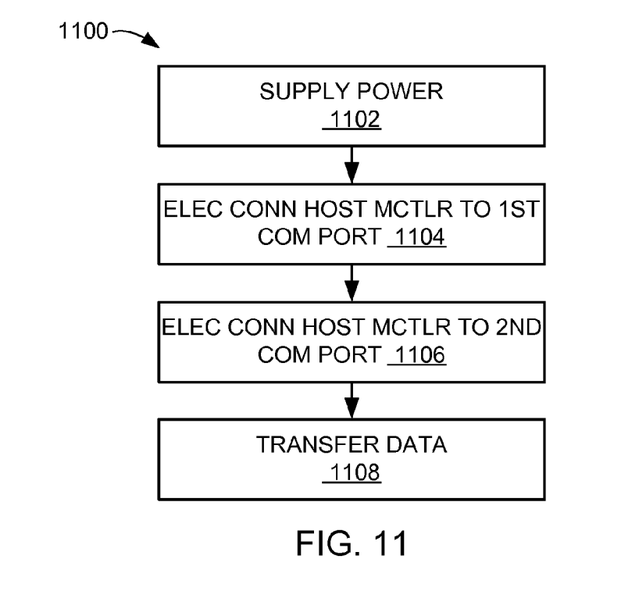
FIG. 11 is a flow chart of a method of operation of the information backup system in a further embodiment of the present invention.

Referring now to FIG. 11, therein is shown a flow chart of a method 1100 of operation of the information backup system 700 in a further embodiment of the present invention. The method 1100 includes: supplying a power to a first communication port and a second communication port in a block 1102; electrically connecting a host microcontroller to the first communication port for connecting a smart phone in a block 1104; electrically connecting the host microcontroller to the second communication port for connecting a mass storage device, the host microcontroller is for functioning as a host to the second communication port and the first communication port in a block 1106; and transferring data between the first communication port and the second communication port in a block 1108.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an information backup system comprising:
    supplying a power to a first communication port and a second communication port with an internal power supply;
    electrically connecting a host microcontroller to the first communication port for connecting a handheld device;
    electrically connecting the host microcontroller to the second communication port for connecting a mass storage device, the host microcontroller is for functioning as a host to the second communication port and the first communication port; and
    transferring data between the first communication port and the second communication port.

2. The method as claimed in claim 1 wherein transferring the data includes transferring the data through the first communication port and the second communication port with hardwire, wireless, a universal serial bus connector, or a combination thereof.

3. The method as claimed in claim 1 wherein transferring the data includes transferring the data in a computer accessible file format.

4. The method as claimed in claim 1 wherein supplying the power includes electrically connecting the internal power supply to a downstream port and another downstream port.

5. The method as claimed in claim 1 wherein transferring the data includes transferring the data between a downstream port and another downstream port.

6. A method of operation of an information backup system comprising:
    supplying a power to a first communication port and a second communication port with an internal power supply;
    electrically connecting a host microcontroller to the first communication port for connecting a handheld device;
    electrically connecting the host microcontroller to the second communication port for connecting a mass storage device, the host microcontroller is for functioning as a host to the second communication port and the first communication port;
    reading data from the first communication port;
    writing the data to the second communication port;
    reading the data from the second communication port; and
    writing the data to the first communication port.

7. The method as claimed in claim 6 wherein:
    reading the data from the first communication port includes reading the data through the first communication port with hardwire, wireless, a universal serial bus connector, or a combination thereof; and
    writing the data to the second communication port includes writing the data through the second communication port with hardwire, wireless, a universal serial bus connector, or a combination thereof.

8. The method as claimed in claim 6 wherein reading the data from the first communication port includes reading the data in a computer accessible file format for a computer.

9. The method as claimed in claim 6 wherein supplying the power includes electrically connecting the internal power supply to the host microcontroller, a downstream port, and another downstream port.

10. The method as claimed in claim 6 wherein:
    reading the data from the first communication port includes reading the data from a downstream port; and
    writing the data to the second communication port includes writing the data to another downstream port.

11. An information backup system comprising:
    an internal power supply for supplying a power to a first communication port and a second communication port; and
    a host microcontroller, coupled to the internal power supply, for electrically connecting to the first communication port for connecting a handheld device, electrically connecting to the second communication port for connecting a mass storage device, transferring data between the first communication port and the second communication port, and functioning as a host to the second communication port and the first communication port.

12. The system as claimed in claim 11 wherein the host microcontroller is for transferring the data through the first communication port and the second communication port with hardwire, wireless, a universal serial bus connector, or a combination thereof.

13. The system as claimed in claim 11 wherein the host microcontroller is for transferring the data in a computer accessible file format.

14. The system as claimed in claim 11 wherein the internal power supply is electrically connected to a downstream port and another downstream port.

15. The system as claimed in claim 11 wherein the host microcontroller is for transferring the data between a downstream port and another downstream port.

16. The system as claimed in claim 11 wherein the host microcontroller is for reading the data from the first communication port, writing the data to the second communication port, reading the data from the second communication port, and writing the data to the first communication port.

17. The system as claimed in claim 16 wherein the host microcontroller is for reading the data from the first communication port includes reading the data through the first communication port with hardwire, wireless, a universal serial bus connector, or a combination thereof and writing the data to the second communication port includes writing the data through the second communication port with hardwire, wireless, a universal serial bus connector, or a combination thereof.

18. The system as claimed in claim 16 wherein the host microcontroller is for reading the data in a computer accessible file format for a computer.

19. The system as claimed in claim 16 wherein the internal power supply is electrically connected to the host microcontroller, a downstream port, and another downstream port.

20. The system as claimed in claim 16 wherein the host microcontroller is for reading the data from a downstream port and writing the data to another downstream port.

* * * * *